United States Patent Office 3,342,767
Patented Sept. 19, 1967

3,342,767
VINYL CHLORIDE RESINS CONTAINING
CYCLIC PHOSPHITES
Robert A. Buckley, Solon, Ohio, assignor to
Ferro Corporation, a corporation of Ohio
No Drawing. Filed June 10, 1964, Ser. No. 374,167
8 Claims. (Cl. 260—31.8)

This invention relates in general to stabilized chloride-containing vinyl resin compositions and more particularly to chloride-containing vinyl resin compositions having a cyclic phosphite compound incorporated therein.

It has been previously proposed to utilize various phosphite compounds for stabilizing chloride-containing vinyl resin compositions against the detrimental effects of heat. However, the phosphite compounds which have been useful as heat stabilizers either fail to overcome the detrimental effects of extended exposure to light, or exert light-stabilizing action only in moderately plasticized and highly plasticized formulations. When used in unplasticized systems or in systems containing a very small amount of plasticizer, the conventional phosphite compounds used do not contribute usefully to light stability.

We have now surprisingly found that an effective stabilization for chloride-containing vinyl resins against light deterioration is obtained by incorporating therein a small amount of a specific class of cyclic phosphite compounds.

While the foregoing cyclic phosphites are known to those familiar to the art, it has not been previously recognized that they are uniquely useful as light stabilizers in chlorine-containing vinyl resins only when present in low concentration, and in the absence of substantial amounts of liquid plasticizer. This failure to recognize the unique role of the cyclic phosphites is not surprising in the light of the relatively harmful effect of these stabilizers on heat stability when used at concentrations normally employed for conventional phosphites, and in the light of their relative ineffectiveness when used in moderately or highly plasticized systems.

Accordingly, it is an object of this invention to prepare a light-stabilized rigid or semi-rigid chloride-containing vinyl composition.

It is a further object to prepare a stabilized rigid or semi-rigid chloride-containing resin composition having a cyclic phosphite compound incorporated therein as a light stabilizer.

Other objects of the invention will become apparent from the following description.

The above objects are accomplished by intimately dispersing in the stabilized chloride-containing vinyl resin composition a small amount of an organic ester of phosphorous acid having the general formula:

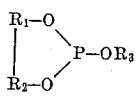

where $R_1$ and $R_2$ are bivalent hydrocarbon structures and where $R_3$ is H or a monovalent hydrocarbon group. It should be clearly noted, however, and understood that when $R_3$ is H the product most probably exists in its phosphonate tautomeric state as illustrated by the following formula:

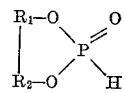

The above phosphites are believed to be substantially free of toxicological hazard. This factor is significant industrially where phosphites range in use from permissible additives in food containers, to violent poisons. Obviously only relatively safe phosphites can be used without undue danger to plant personnel or to the ultimate consumer.

The chloride-containing vinyl resins employed in this invention are all well known in the art. The preferred embodiment of this invention utilizes the homopolymer of vinyl chloride. However, this invention is also applicable to the co-polymers of vinyl chloride with other co-monomers, especially where vinyl chloride is the principal monomer present; and to the polymers and co-polymers of vinylidene chloride, including vinyl chloride-vinylidene chloride co-polymer in which either the vinyl chloride or the vinylidene chloride is the predominant monomer.

The phosphites of the present invention as indicated above are cyclic in structure. They may be additionally defined as an organic ester of phosphorous acid in which two of the acidic hydrogens are replaced by a single organic moiety in such a way as to form a five or six membered ring, one member of which is the phosphorous atom.

I have determined that the foregoing cyclic phosphites are efficient light stabilizers only when they are present in the compositions between 0.01 and 0.12 part per 100 parts of resin. If the phosphites of this invention are present in the composition in excess of 0.12 part per 100 parts of resin, the product deteriorates too rapidly, on heating, to have commercial utility. Furthermore no additional resistance to light is observed. It has also been determined that about 0.01 part per 100 parts of resin represents the lowest amount of cyclic phosphite that can be mixed in the novel composition and still achieve the desired results.

Specific examples of the phosphites which are contemplated for use in accordance with this invention include:

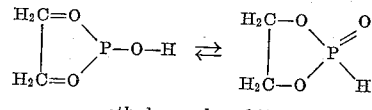

ethylene phosphite

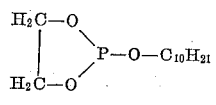

decyl ethylene phosphite

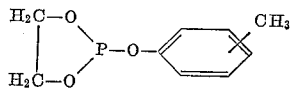

cresyl ethylene phosphite

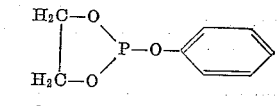

phenyl ethylene phosphite

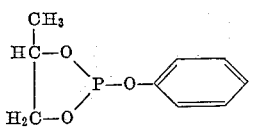

phenyl propylene phosphite

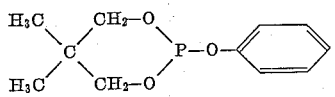

phenyl neopentylene phosphite

The compositions of this invention are preferably free of any plasticizer; however, the use of a small amount thereof is permissible if a slightly flexible or semi-rigid product is desired. However, it is pointed out that only a slight amount of plasticizer, less than 10 parts per 100 parts of resin, may be employed. When the plasticizer content of the composition increases in concentration above 10 parts per 100 parts of resin, the cyclic phosphites of this invention no longer demonstrate any significant superiority in light stabilization over the more conventional types of phosphites. Since the conventional phosphites are superior in heat stabilizing characteristics, there appears to be no merit in the use of the cyclic phosphites of this invention in compositions containing more than 10 parts of plasticizer per 100 parts of resin. This difference in stabilizer properties between highly plasticized and relatively unplasticized systems is a phenomenon which is consistent with industrial stabilizer experience and accounts in part for the wide variety of stabilizer compositions necessary to supply the needs of the processors of polyvinyl chloride and related resins. Any of the well known plasticizers may be employed at low concentrations in the practice of this invention. Thus, di(2-ethylhexyl)phthalate may be used at 5 parts per 100 parts of resin.

A heat stabilizer is incorporated in the composition to prevent discoloration or loss of mechanical properties during thermal processing to form a shape in which the composition will ultimately be used. The compositions of this invention are best stabilized by sulfur containing organotin compounds (e.g., dibutyltin bis(octylthioglycollate)), or by various barium- and cadmium-containing stabilizers especially those in which one or both of the metals is present in the form of a salt of a carboxylic acid. Other auxiliary stabilizer components such as polyhydric alcohols or phenolic anti-oxidants may also be present, although they are not critical to the practice of this invention. Heat stabilizers of the type noted are generally used at 1 to 3 parts per 100 parts of resin, although for very severe thermal processing up to 5 parts may be required.

The phosphites along with the additional stabilizing and other compounds may be admixed with the previously mentioned resins by any of the well known prior art methods. The materials may be added to the resins and mixed therein by a hot roll or other machines adapted for this purpose. The materials to be added may also be dissolved in a solvent and then mixed with the resin. The predominant requisite is that the phosphites and other materials be thoroughly mixed and completely dispersed one within the other.

So that the effect of the organic phosphite esters is clearly understood the following examples are given.

In the examples given in Table I below the following basic vinyl composition was used:

| | Parts |
|---|---|
| Polyvinyl chloride resin | 100.0 |
| Dibutyltin bis(octylthioglycollate) | 2.0 |
| Phosphite | 0.05 |
| Stearic acid | 0.25 |

The foregoing ingredients were mixed on a two roll mill for 10 minutes at 350° F. A portion of the sheet was used for heat testing in a forced convection oven at 365° F. A second portion was tested for light resistance by exposure in a Fade-Ometer for 192 hours.

TABLE I

| | Phosphite Used | Heat [1] Stability | Fade-Ometer blackening at 192 hours |
|---|---|---|---|
| 1 | None (control) | 75 | Extensive. |
| 2 | Triphenyl phosphite | 80 | Do. |
| 3 | Isodecyl diphenyl phosphite | 75 | Do. |
| 4 | Ethylene phosphite | 55 | Almost none. |
| 5 | Decyl ethylene phosphite | 70 | Do. |
| 6 | Cresyl ethylene phosphite | 70 | Slight. |
| 7 | Phenyl neopentylene phosphite | 75 | Almost none. |

[1] The heat stability of the examples set forth in this table indicates the number of minutes to attain the same degree of discoloration as the control example (1) has attained at 75 minutes.

In the above Table I, Examples 2 and 3 show that ordinary phosphite compounds, which are outside the scope of this invention, are not capable of being utilized as light stabilizers. However, from the results of Examples 4 to 7 it is evident that the cyclic phosphites contemplated for use in my novel compositions effect a vast and startling improvement in the light resistance of chloride-containing vinyl resins without any significant change in the corresponding heat stability.

In Table II below, the same basic formulation as given above was formulated except that the phosphite was used at lower concentration, and was added in a 2 percent solution in isopropanol. Thus the phosphites are present in the examples set forth in this table at about 0.01 part per 100 parts of resin.

TABLE II

| | Phosphite Used | Heat [1] Stability | Fade-ometer blackening at 144 hours |
|---|---|---|---|
| 1 | None (control) | 90 | Extensive. |
| 2 | Ethylene phosphite | 85 | None. |
| 3 | Phenyl ethylene phosphite | 85 | Do. |

[1] The heat stability of the examples set forth in this table indicate the number of minutes to attain the same degree of discoloration as the control (1) attained in 90 minutes.

Here as in Table I, considerable improvement is evident from the results obtained in light resistance while exhibiting no material detraction from heat stability.

The following example in Table III below is given to illustrate the basic vinyl composition containing a cyclic phosphite light stabilizer but incorporating a barium-cadmium heat stabilizer.

In the example listed in Table III below the following vinyl formulation was used:

| | Parts |
|---|---|
| Polyvinyl chloride resin | 100.0 |
| Barium-cadmium heat stabilizer | 1.5 |
| Phosphite | 0.2 |
| Stearic acid | 0.25 |

The foregoing ingredients were mixed on a two-roll mill for 10 minutes at 350° F. The resulting sheet was tested for light degradation in a Xeno-test machine. This type of machine was employed to show that vastly improved light resistance is obtained with my novel compositions under any type of test conditions. The spectrum of light to which the samples are exposed in this test is notably similar to that of sunlight at the earth's surface, except that it is more intense. Thus, this test is regarded as an accelerated replication of outdoor weathering in intense sunlight.

These examples show that a resin having an opaque pigment therein is also improved in light resistance when the cyclic phosphites are also included in the resin.

TABLE III

| | Phosphite Used | 284 hrs. | 711 hrs. | 1,000 hrs. |
|---|---|---|---|---|
| 1 | None (control) | Very slight brown color | Definite brown color | Dark brown color. |
| 2 | Ethylene phosphite | No color | Trace | Trace. |

The results indicated above in Table III show that a resin composition stabilized with a barium-cadmium combination and having a cyclic phosphite incorporated therein will demonstrate a considerable improvement in light resistance when tested under very exacting conditions.

In the following examples listed in Table IV below the same formulation was prepared as in Table I except that dioctyl phthalate (DOP) was added as a plasticizer.

Other additive materials, such as coloring substances, may be incorporated into the resin composition along with the above mentioned phosphites of the present invention.

It is, therefore, particularly pointed out and distinctly claimed as the invention:

1. A composition comprising 100 parts by weight of a polymer whose principal monomeric units are units of a member selected from the group consisting of vinylidene

TABLE IV

| | Phosphite Used | Plasticizer | Plasticizer Concentration (parts) | Heat Stability [1] | Fade-Ometer blackening at— | |
|---|---|---|---|---|---|---|
| | | | | | 96 hrs. | 144 hrs. |
| 1 | None | DOP | 2.5 | 105 | Distinct | Severe. |
| 2 | Ethylene phosphite | DOP | 2.5 | 90 | None | Trace. |
| 3 | Phenyl ethylene phosphite | DOP | 2.5 | 90 | ---do--- | Do. |

[1] The heat stability of the examples set forth in this table indicate the number of minutes to attain the same degree of discoloration as the control example (1) has attained in 105 minutes.

The results shown above indicate that lightly plasticized chloride-containing resins have improved light resistance when the present cyclic phosphites are incorporated therein.

In Table V below the same formulation was prepared as in Table IV above. However, the concentration of dioctyl phthalate is increased to 5 parts per 100 parts of resin.

chloride and vinyl chloride, 0 to 10 parts of plasticizer, 0.5 to 5 parts of heat stabilizing material and from about 0.01 to about 0.12 part of a light stabilizing material, said light stabilizing material being an organic ester of phosphorous acid having the formula:

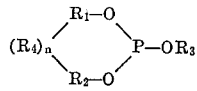

TABLE V

| | Phosphite Used | Plasticizer | Plasticizer Concentration (parts) | Heat Stability [1] | Fade-Ometer blackening at— | |
|---|---|---|---|---|---|---|
| | | | | | 96 hrs. | 144 hrs. |
| 1 | None | DOP | 5 | 120 | Distinct | Severe. |
| 2 | Ethylene phosphite | DOP | 5 | 90 | None | Do. |
| 3 | Phenyl ethylene phosphite | DOP | 5 | 105 | ---do--- | Do. |

[1] The heat stability of the examples indicate the number of minutes to attain the same degree of discoloration as the control example (1) has attained in 120 minutes.

The results indicate that lightly plasticized chloride resins containing cyclic phosphites will show improvement in light resistance. Here the plasticizer concentration is about double that of Example IV but it is still sufficiently low to be regarded as lightly plasticized.

Table VI utilized the same formulation as prepared in Table I except that 1 part per 100 parts of resin of titanium oxide as an opaque pigment is incorporated into the formulation.

wherein $R_1$, $R_2$ and $R_4$ are members selected from the group consisting of:

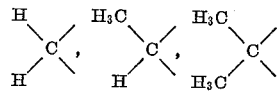

$n$ is 0 to 1, and $R_3$ is a member selected from the group consisting of hydrogen, monovalent aromatic hydrocarbons having less than 10 carbon atoms, and monovalent

TABLE VI

| | Phosphite Used | Colorant | Colorant concentration (parts) | Heat Stability [1] | Fade-Ometer blackening at 168 hrs. |
|---|---|---|---|---|---|
| 1 | None | TiO$_2$ | 1 | 60 | Distinct. |
| 2 | Ethylene phosphite | TiO$_2$ | 1 | 45 | Trace. |
| 3 | Phenyl ethylene phosphite | TiO$_2$ | 1 | 60 | None. |

[1] The heat stability is the number of minutes required to reach the approximate degree of discoloration attained by the respective control sample in the time shown.

aliphatic hydrocarbons having less than 13 carbon atoms, and wherein, when $n$ is 0, a carbon to carbon bond exists between $R_1$ and $R_2$; said parts of plasticizer, heat stabilizer, and light stabilizer, being parts by weight based on the weight of said polymer.

2. The composition according to claim 1 wherein said light stabilizer is an organic ester of phosphorous acid selected from the group consisting of ethylene phosphite, decyl ethylene phosphite, cresyl ethylene phosphite, phenyl ethylene phosphite, phenyl propylene phosphite and phenyl neopentylene phosphite.

3. The composition according to claim 1 wherein said polymer is a vinyl chloride homopolymer.

4. The composition according to claim 3 wherein said heat stabilizing material is composed of at least one member selected from the group consisting of sulphur containing organotin compounds, barium salts of a carbolic acid, cadmium salts of a carboxylic acid, and polyhydric alcohols, and wherein the total cumulative weight of all such heat stabilizing materials is from 1 to 3 parts by weight based on the weight of said polymer.

5. The composition according to claim 3 wherein said light stabilizer is an organic ester of phosphorous acid selected from the group consisting of ethylene phosphite, decyl ethylene phosphite, cresyl ethylene phosphite, phenyl ethylene phosphite, phenyl propylene phosphite and phenyl neopentylene phosphite.

6. In the stabilizing of a polymer whose principal monomeric units are units of a member selected from the group consisting of vinyl chloride and vinylidene chloride, said polymer having admixed therewith from 0 to 10 parts of plasticizer and from 0.5 to 5 parts of heat stabilizing material, the improvement which comprises admixing with said polymer from 0.01 to 0.12 part of a light stabilizer which is an organic ester of phosphorous acid having the formula:

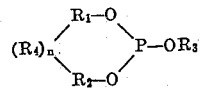

wherein $R_1$, $R_2$ and $R_4$ are members selected from the group consisting of:

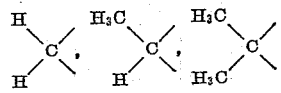

$n$ is 0 to 1, and $R_3$ is a member selected from the group consisting of hydrogen, monovalent aromatic hydrocarbons having less than 10 carbon atoms, and monovalent aliphatic hydrocarbons having less than 13 carbon atoms, and wherein, when $n$ is 0, a carbon to carbon bond exists between $R_1$ and $R_2$, said parts of plasticizer, heat stabilizer and light stabilizer being parts by weight based on the weight of said polymer.

7. The stabilization of a polymer according to claim 6 wherein said polymer is a vinyl chloride homopolymer.

8. The stabilization of a polymer according to claim 7 wherein said light stabilizer is an organic ester of phosphorous acid selected from the group consisting of ethylene phosphite, decyl ethylene phosphite, cresyl ethylene phosphite, phenyl ethylene phosphite, phenyl propylene phosphite and phenyl neopentylene phosphite.

References Cited
UNITED STATES PATENTS

| | | | |
|---|---|---|---|
| 2,707,178 | 4/1955 | Wilson | 260—31.8 |
| 2,834,798 | 5/1958 | Hechenbleikner et al. | 260—45.8 |
| 2,839,563 | 6/1958 | Heckenbleikner | 260—45.8 |
| 3,039,993 | 6/1962 | Friedman | 260—967 |

OTHER REFERENCES

Barron: Modern Plastics; Chapman & Hall, Ltd.; 1949; pages 495, 496, 498–502; Scientific Library, TP 1120 B25.

MORRIS LIEBMAN, *Primary Examiner.*

L. T. JACOBS, *Assistant Examiner.*